(12) United States Patent
King

(10) Patent No.: US 6,516,553 B1
(45) Date of Patent: Feb. 11, 2003

(54) MID FIN SPINNING FISH LURE

(75) Inventor: Franklin H. King, 3950 Coburg Rd. Spc. 34, Eugene, OR (US) 97408

(73) Assignee: Franklin H. King, Eugene, OR (US)

( * ) Notice: Subject to any disclaimer, the term of this patent is extended or adjusted under 35 U.S.C. 154(b) by 0 days.

(21) Appl. No.: 09/947,773

(22) Filed: Sep. 6, 2001

(51) Int. Cl.[7] .............................................. A01K 85/00
(52) U.S. Cl. ..................................................... 43/42.16
(58) Field of Search ........................... 43/42.14, 42.15, 43/42.16, 42.17

(56) References Cited

U.S. PATENT DOCUMENTS

| | | | | |
|---|---|---|---|---|
| 1,854,024 A | * | 4/1932 | Farley | |
| 1,897,529 A | * | 2/1933 | Palmer et al. | 43/42.14 |
| 2,214,668 A | * | 9/1940 | Erickson | 403/329 |
| 2,238,292 A | * | 4/1941 | Schavey | 43/42.17 |
| 2,792,661 A | * | 5/1957 | Denby | 43/42.16 |
| 2,895,253 A | * | 7/1959 | Hess | 43/42.15 |
| 2,926,451 A | * | 3/1960 | Leba | 43/42.14 |
| 3,012,357 A | * | 12/1961 | Helin | 43/42.17 |
| 3,296,734 A | * | 1/1967 | Johnson | 43/42.09 |
| 3,805,437 A | * | 4/1974 | Harris | 43/42.13 |
| 5,138,789 A | * | 8/1992 | Hood | 43/42.13 |
| 5,412,900 A | * | 5/1995 | Rosek | 43/42.14 |
| 5,499,470 A | * | 3/1996 | Reed | 43/42.06 |
| 5,519,960 A | * | 5/1996 | Cular | 43/42.17 |

* cited by examiner

Primary Examiner—Thomas Price

(57) ABSTRACT

Fishing lure main bodies are formed from sheet metal with mid section power fins cut from the sides during manufacture and folded behind a leading end triangular shaped head in opposed direction on which water acts to impart rotation to the lures.

5 Claims, 3 Drawing Sheets

MID FIN SPINNING FISH LURE

BACKGROUND OF THE INVENTION

The present invention pertains to fishing lures and particularly those having an action simulating live bait.

A class of lure is directed toward simulating the action of a live minnow or other live bait to attract fish. Additionally, it is common practice to provide a lure with a finish which reflects light, also further simulating a minnow or other bait. Fins or other appendages on lures serve to impart a rolling action to a lure as it moves through the water to enhance lure attractiveness.

Prior art revolving body lures had the objectionable distinction of causing line-twisting wrap up.

SUMMARY OF THE INVENTION

The present invention is embodied in lures having elongated bodies with lengthwise oriented fins, each terminating in opposite directed end segments providing a fish attracting action to the lures.

The main bodies of the present lures may be formed from metal, which lends itself to finishing resulting in a highly reflective surface. During lure manufacture, mid body extending side fins are formed which are subsequently shaped to provide end segments on which water acts to impart movement to the lures about the lengthwise axis of the main bodies.

It is an object of the present invention to design revolving body lures of different body configuration.

It is a further object of the present invention to design body lures having integral mid body fins which are shaped to impart rotation to the lure body as it moves through the water.

It is still a further object of the present invention to provide a revolving lure body capable of both a forward or reverse wind.

It is in addition a further object of the present invention to construct a rotating body lure supporting plastic fins. It is yet a further object of the present invention to construct fin attachment split tail flasher trailers.

Other embodiments, features and advantages of the invention will become apparent upon reading the specifications.

DETAILED DESCRIPTION OF THE INVENTION

Figure 1:
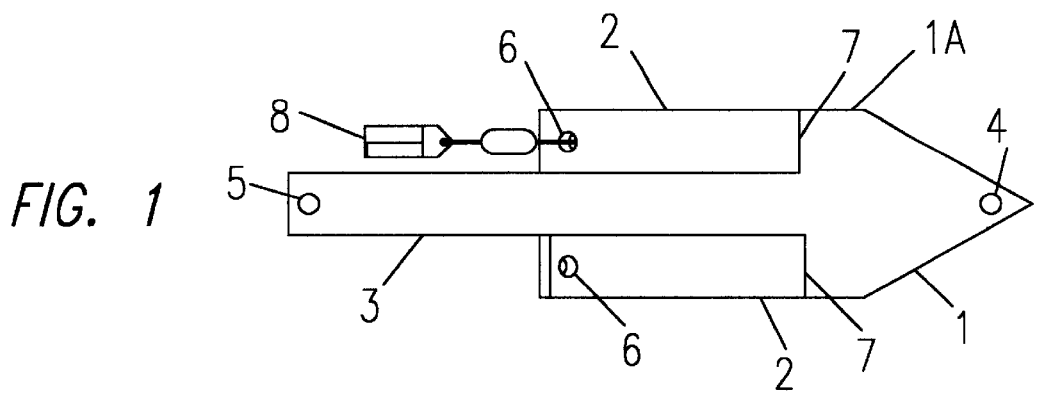
FIG. 1 is a top plan view of a spinner-fishing lure supporting a triangular head supporting opposed outer fins with a split tail flasher attached and a body bar.

In the various embodiments illustrated in the drawings, common parts have common numbers.

For simplicity, the various embodiments show no fish hooks or fish lines attached to respective open ports.

Formation of the various lure embodiments of sheet metal, which may be polished to a bright finish, is highly desirable in that the lures may reflect light in the manner of a small fish or minnow.

Formation of the various embodiments may be accomplished in a die cutting operation.

FIGS. 1–4 show a spinning lure body with a leading end supporting a triangular head 1 with a leading end fish line attachment open port 4; in addition, the triangular head 1, supports two opposed power fins, 2 with trailing end power fin attachment open ports 6. The triangular head 1 further supports a body bar 3, supporting a trailing end hook attachment open port 5. The power fins 2 are cut at midpoint at the outer edges of the body bar 3. This arrangement provides strike zone space unhindered by the spinning power fins 2.

Figure 2:
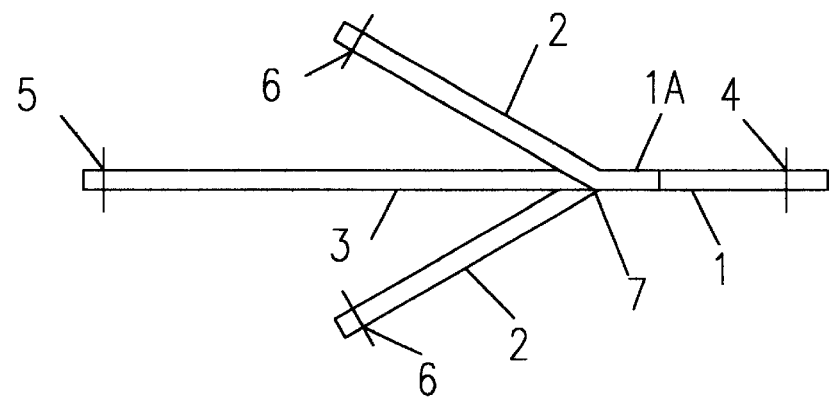
FIG. 2 is a side elevation view of the FIG. 1 lure.

The power fins 2 are folded at a fold line 7, at the triangular head rectangular base 1A. The power fins 2 are folded in opposed position on opposite sides of the body bar 3, as shown in FIG. 2.

A split tail flasher 8 comprising a triangular head 9 with a leading end flasher attachment open port 11, supports matching opposed split power fins 10, folded at a fold line 12 at a triangular head rectangular base 9A.

The split tail flasher 8 acts as a trailer attachment to power fins 2. A barrel swivel 13 supporting swivel open mounting eyes 14 at either end are used to connect the split tail flasher 8 to the power fins 2, as shown in FIGS. 1 and 4.

Figure 3:
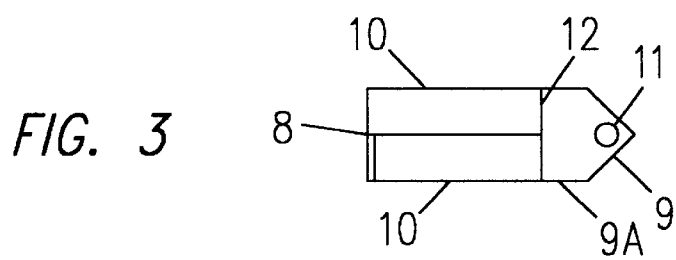
FIG. 3 is a top plan view of the split tail flasher of FIG. 1.

FIG. 3 shows an enlarged view of the split tail flasher 8.

Figure 4:
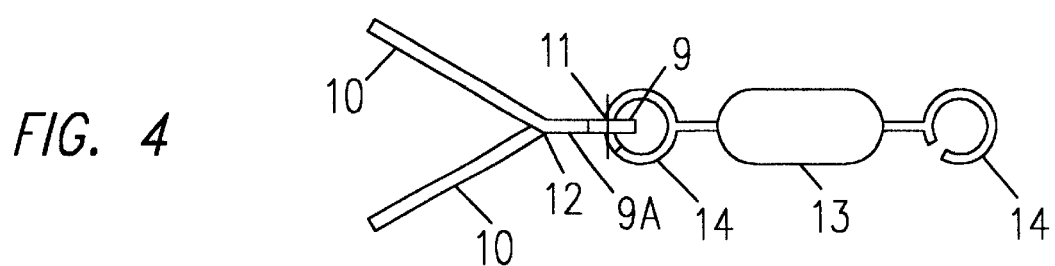
FIG. 4 is a side elevation view of the barrel swivel of FIG. 1., with the FIG. 1 split tail flasher attached.

FIG. 4 shows an enlarged view of the barrel swivel 13 connected to an enlarged view of the split tail flasher 8. One swivel open eye 14 is shown mounted and closed in the flasher attachment open port 11.

The other swivel open eye 14 is to be mounted in the power fin attachment open port 6, as shown in FIG. 1.

The split tail flasher 8 when retrieved or trolled in water becomes a spinning flutter wing, fish attractant.

The split tail flasher may be replaced by other trailer fish attractants such as mini-jig skirts, feather jigs, and the like.

In use, FIG. 1, lure is attached to a fish line with a ball bearing-swivel of proper size.

A swivel wire clasp is inserted through the fish line attachment open port 4, and locked in place to cast and retrieve, by rod and reel action or trolling.

The ball bearing swivel minimizes line twist wrap up. If the line should twist to wrap up, hook the swivel in the hook attachment open port 5. Cast the lure 1 and retrieve or troll The lure will reverse spin and unwind the line, and still, fish can be caught.

This means the lure hooked by the trailing end will spin in one direction when dropped headfirst into the water and in reverse spin on upward retrieve. This means these lures may be used for ice fishing or over-the-edge of a boat or a pier.

The water pressure reverses from front to back of the power fins 2 planer surfaces on reverse retrieve. This spinning flashes light, attracting predator fish to strike the lure.

The revolving power fins 2 agitate the water on troll or retrieve, sending out sound waves. This attracts predator fish. This is especially prevalent when a hook is attached to the fish line attachment mounting open port 4 and a fish line is attached to the hook attachment open port 5.

Figure 5:
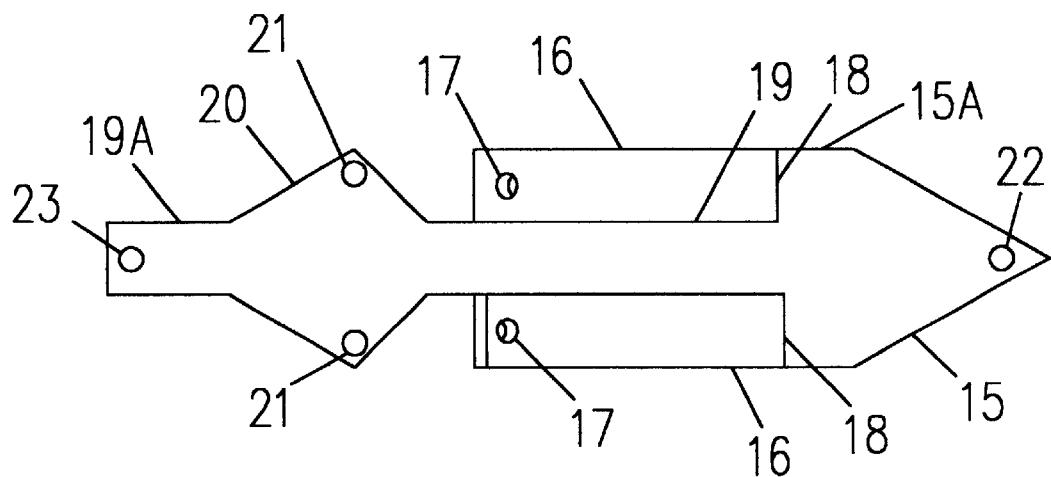
FIG. 5 is a top plan view of a spinner-fishing lure supporting a triangular head, supporting outer opposed fins and a three-part body.
Figure 6:
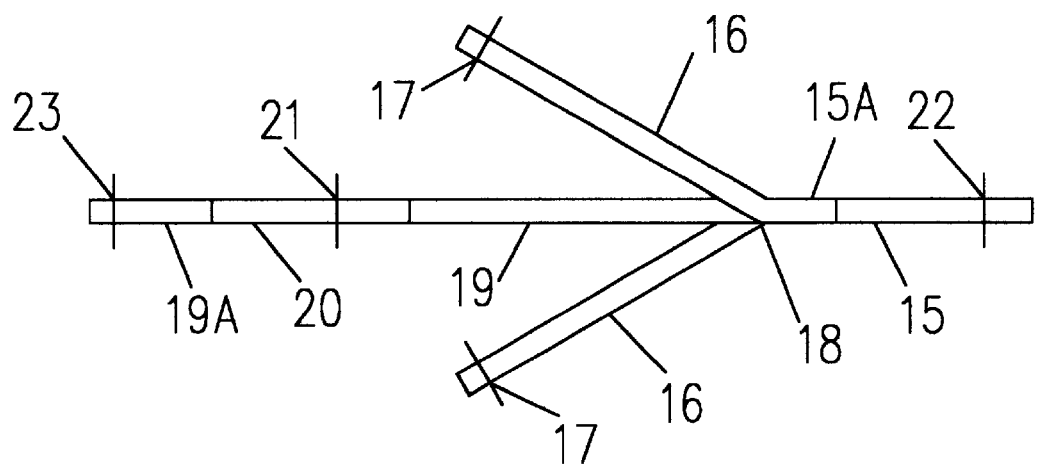
FIG. 6 is a side elevation of FIG. 5 lure.

FIGS. 5 and 6 show a FIG. 1 lure with a change in that a three-part body is used. As shown, a triangular head 15 supports power fins 16 cut at the lure center section and folded at fold line 18 of the triangular head rectangular base 15A in opposed direction as shown in FIG. 6, at respective lure outer edges.

This leaves a forward body bar 19. The forward body bar 19 supports a diamond-shaped main body 20 formed to its trailing end, just past the power fins 16 trailing ends. The main body 20 supports a short aft body bar 19A dimensioned to the width of the forward body bar 19.

The aft body bar 19A supports a hook attachment open port 23, for fishhook attachment.

The main body 20 has hook attachment open ports 21 at its outer corners for hook attachment as well as skirts.

The triangular head 15, has a fish line attachment open port 22 at its leading end point edge, for fish line attachment.

The power fins 16 are fitted with trailing end power fin attachment open ports 17 for hook or trailer attachments, such as skirts.

In use, FIG. 5 may be attached to a fish line at the fish line attachment open port 22 and trolled or rod and reel cast and retrieved, through the water. FIG. 5 has the same attributes as the FIG. 1 lure details. Trailers such as live or plastic worms may be used on a fishhook attached to the hook attachment open port 23.

Figure 7:
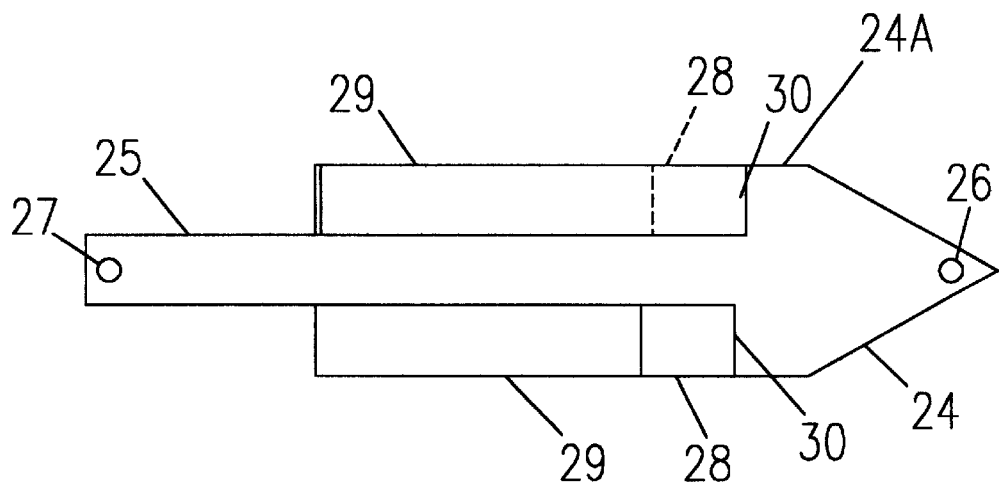
FIG. 7 is a top plan view of a spinner fishing lure supporting a triangular head supporting short opposed outer fins supporting bonded in place, plastic fins and a body bar.
Figure 8:
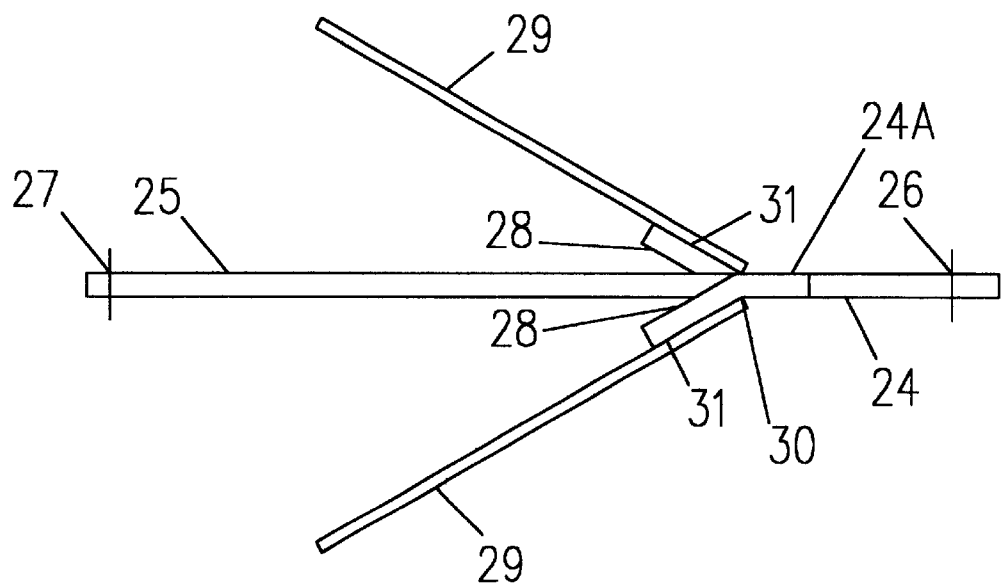
FIG. 8 is a side elevation view of FIG. 7.

FIGS. 7 and 8 show a FIG. 1 lure with a change in that a triangular head 24 supports short support fins 28, folded at a fold line 30 at the base of a triangular head rectangular base 24A. In addition, plastic power fins 29 are bonded to the planer surfaces of the short support fins 28 as shown by bond 31. The plastic power fins 29 may be bonded as shown or on the under sides of the short support fins 28. The plastic power fins 29 may be constructed of stiff or pliable material.

A body bar 25 supports a trailing end hook attachment open port 27. The triangular head 24 supports a leading end fish line attachment open port 26.

The fins 29 can be cut from rubber sheet material, instead of plastic.

In use, the FIG. 7 lure may be attached to a fish line by swivel attachment to the fish line attachment open port 26, the lure may be trolled or cast and retrieved by rod and reel action.

The main reason for the plastic fins 29 is that they allow a predator fish to strike the lure with minimum interference from metal power fins.

The fins of plastic may be of different color or multicolored such as paste-on flash material. Skirts such as used on plastic jigs may be used in place of the plastic power fins 29.

The short support fins 28 are powerful enough to revolve the lure in the water. The extra drag of the plastic power fins enhances spin.

There has been described novel spinning body fish lures. It is evident those skilled in the art may now make numerous uses and modifications of and departures from the specific embodiments described herein without departing from the incentive concepts. Consequently, the invention is to be construed as embracing each and every feature and novel combination present

What is claimed is:

1. A fishing lure comprising:
   a. a triangular head having an apex that forms the leading end thereof and a trailing edge opposite said leading end, said trailing edge of said triangular head having a rectangular base extending rearwardly therefrom, said rectangular base being integral with said triangular head, said rectangular base and said triangular head having common upper and lower planar surfaces;
   b. an elongated main body bar integral with said rectangular base and extending rearwardly therefrom, said main body bar and said rectangular base having common upper and lower planar surfaces, said main body bar having a lengthwise extending central axis, first and second side edges parallel to said central axis, and a trailing end edge;
   c. first and second rectangular power fins extending rearwardly from said rectangular base adjacent said first and second side edges of said main body bar, respectively, said first power fin being folded upwardly away from said upper planar surface of said rectangular base, said second power fin being folded downwardly away from said lower planar surface of said rectangular base, each of said power fins having a trailing edge located adjacent a midpoint of said main body bar;
   d. said triangular head having a fish line attachment open port located adjacent said leading end thereof;
   e. said body bar having a hook mounting open port adjacent said trailing end edge thereof;
   f. each of said first and second power fins having a power fin attachment open port adjacent said trailing edge thereof;
   g. each of said power fin attachment open ports having an open eye barrel swivel having a leading end that is attached to said power fin attachment open port;
   h. each of said open eye barrel swivels having a trailing end attached to a split tail flasher;
   i. each of said split tail flashers including a triangular flasher head, said triangular flasher head having an apex that forms the leading end thereof and a trailing edge opposite said leading end, a rectangular flasher base extending rearwardly from said trailing edge of said triangular flasher head, said rectangular flasher base being integral with said triangular flasher head, and first and second rectangular flasher power fins extending rearwardly from said rectangular flasher base, said first and second rectangular power fins being folded away from said rectangular flasher base in opposite directions;
   j. each of said triangular flasher heads having a flasher attachment open port located adjacent its leading end through which said open eye barrel swivel is attached.

2. The fishing lure of claim 1 wherein that portion of said main body bar located inwardly of the trailing end edge thereof and rearwardly of the trailing edges of said first and second power fins is diamond shaped with outer edge points, said diamond shaped portion of said main body bar having hook attachment open ports positioned adjacent said outer edge points.

3. The fishing lure of claim 1 wherein said trailing edges of said first and second power fins terminate before the midpoint of said main body bat, and first and second elongated power fin extensions are bonded to said first and second power fins, respectively.

4. A fishing lure comprising:
   a. a triangular head having an apex that forms the leading end thereof and a trailing edge opposite said leading end, said trailing edge of said triangular head having a rectangular base extending rearwardly therefrom, said rectangular base being integral with said triangular head, said rectangular base and said triangular head having common upper and lower planar surfaces;

b. an elongated main body bar integral with said rectangular base and extending rearwardly therefrom, said main body bar and said rectangular base having common upper and lower planar surfaces, said main body bar having a lengthwise extending central axis, first and second side edges parallel to said central axis, and a trailing end edge;

c. first and second rectangular power fins extending rearwardly from said rectangular base adjacent said first and second side edges of said main body bar, respectively, said first power fin being folded upwardly away from said upper planar surface of said rectangular base, said second power fin being folded downwardly away from said lower planar surface of said rectangular base, each of said power fins having a trailing edge located adjacent a midpoint of said main body bar, that portion of said main body bar located inwardly of the trailing end edge thereof and rearwardly of the trailing edges of said first and second power fins being diamond shaped with outer edge points, said diamond shaped portion of said main body bar having hook attachment open ports located adjacent said outer edge points;

d. said triangular head having a fish line attachment open port located adjacent said leading end thereof;

e. said body bar having a hook mounting open port adjacent said trailing end edge thereof;

f. each of said first and second power fins having a power fin attachment open port adjacent said trailing edge thereof;

g. each of said power fin attachment open ports having an open eye barrel swivel having a leading end that is attached to said power fin attachment open port;

h. each of said open eye barrel swivels having a trailing end attached to a split tail flasher;

i. each of said split tail flashers including a triangular flasher head, said triangular flasher head having an apex that forms the leading end thereof and a trailing edge opposite said leading end, a rectangular flasher base extending rearwardly from said trailing edge of said triangular flasher head, said rectangular flasher base being integral with said triangular flasher head, and first and second rectangular flasher power fins extending rearwardly from said rectangular flasher base, said first and second power fins being folded away from said rectangular flasher base in opposite directions;

j. each of said triangular flasher heads having a flasher attachment open port located adjacent its leading end through which said open eye barrel swivel is attached.

5. A fishing lure comprising:

a. a triangular head having an apex that forms the leading end thereof and a trailing edge opposite said leading end, said trailing edge of said triangular head having a rectangular base extending rearwardly therefrom, said rectangular base being integral with said triangular head, said rectangular base and said triangular head having common upper and lower planar surfaces;

b. an elongated main body bar integral with said rectangular base and extending rearwardly therefrom, said main body bar and said rectangular base having common upper and lower planar surfaces, said main body bar having a lengthwise extending central axis, first and second side edges parallel to said central axis, and a trailing end edge;

c. first and second rectangular power fins extending rearwardly from said rectangular base adjacent said first and second side edges of said main body bar, respectively, said first and second power fins having trailing edges that terminate before the midpoint of said main body bar, said first power fin being folded upwardly away from said upper planar surface of said rectangular base, said second power fin being folded downwardly away from said lower planar surface of said rectangular base, said first and second power fins having first and second elongated power fin extensions bonded thereto, respectively;

d. said triangular head having a fish line attachment open port located adjacent said leading end thereof;

e. said body bar having a hook mounting open port adjacent said trailing end edge thereof;

f. each of said first and second power fins having a power fin attachment open port adjacent said trailing edge thereof;

g. each of said power fin attachment open ports having an open eye barrel swivel having a leading end that is attached to said power fin attachment open port;

h. each of said open eye barrel swivels having a trailing end attached to a split tail flasher;

i. each of said split tail flashers including a triangular flasher head, said triangular flasher head having an apex that forms the leading end thereof and a trailing edge opposite said leading end, a rectangular flasher base extending rearwardly from said trailing edge of said triangular flasher head, said rectangular flasher base being integral with said triangular flasher head, and first and second rectangular flasher power fins extending rearwardly from said rectangular flasher base, said first and second power fins being folded away from said rectangular flasher base in opposite directions;

j. each of said triangular flasher heads having a flasher attachment open port located adjacent its leading end through which said open eye barrel swivel is attached.

* * * * *